(12) United States Patent
Madan et al.

(10) Patent No.: US 12,499,087 B2
(45) Date of Patent: Dec. 16, 2025

(54) AUTOMATED CONVERSION OF BIG DATA QUERIES AND SCRIPTS

(71) Applicant: American Express Travel Related Services Company, Inc., New York, NY (US)

(72) Inventors: Aman Madan, Toronto (CA); Ritesh Kumar Bansal, Gurgaon (IN); Annie Arora, Gwalior (IN); Deeksha Sikarwar, Gwalior (IN); Pulkit Aggarwal, Chandigarh (IN); Drishti Ohri, New Delhi (IN); Phanikalyan Cherukuri, Phoenix, AZ (US); Man Chon U, Sunrise, FL (US); Ashok K Nair, Phoenix, AZ (US); Anna Korsakova Bain, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 18/218,167

(22) Filed: Jul. 5, 2023

(65) Prior Publication Data
US 2025/0013605 A1   Jan. 9, 2025

(51) Int. Cl.
*G06F 16/13* (2019.01)
*G06F 16/11* (2019.01)
*G06F 16/14* (2019.01)

(52) U.S. Cl.
CPC .......... *G06F 16/144* (2019.01); *G06F 16/116* (2019.01); *G06F 16/13* (2019.01)

(58) Field of Classification Search
CPC ....... G06F 16/144; G06F 16/116; G06F 16/13
(Continued)

(56) References Cited

U.S. PATENT DOCUMENTS 11,061,652 B1 * 7/2021 Biswas ................. G06F 8/427
11,200,611 B2 * 12/2021 Piramuthu ......... G06Q 30/0627
(Continued)

FOREIGN PATENT DOCUMENTS

CN          111198898 A  *  5/2020
CN          113535758 B  *  12/2021

*Primary Examiner* — Amy Ng
*Assistant Examiner* — Antonio J Caiado
(74) *Attorney, Agent, or Firm* — STERNE, KESSLER, GOLDSTEIN & FOX P.L.L.C.

(57) ABSTRACT

Disclosed herein are system, method, and computer program product embodiments for converting queries and scripts used in big data systems. A script conversion system converts a script and its queries from a first big data format to a second big data format. The script conversion system uses a configuration mapping that includes direct and/or indirect function mappings. For the direct mapping, the script conversion system replaces the function with a new function in the second big data format. For the indirect mapping, the script conversion system constructs an equivalent function in the second big data format using information extracted from parsing queries in the first big data format. The script conversion system also formats a converted query using a project mapping and/or generates a conversion report indicating successful or unsuccessful conversions. Scripts may be converted from an on-premises data warehouse system to a cloud-based data warehouse system.

17 Claims, 5 Drawing Sheets

(58) Field of Classification Search
USPC .......................................................... 707/756
See application file for complete search history.

(56) References Cited

U.S. PATENT DOCUMENTS

| | | | | |
|---|---|---|---|---|
| 2009/0063431 A1* | 3/2009 | Erol | .................... | G06V 10/993 |
| 2013/0124483 A1* | 5/2013 | Furuhashi | ........... | G06F 16/2365 |
| | | | | 707/661 |
| 2015/0324422 A1* | 11/2015 | Elder | ...................... | G06F 40/40 |
| | | | | 707/722 |
| 2016/0182607 A1* | 6/2016 | Pan | .................... | G06Q 30/0201 |
| | | | | 709/217 |
| 2017/0109421 A1* | 4/2017 | Stearn | .................... | G06F 16/258 |
| 2017/0161346 A1* | 6/2017 | Bryan | .................... | G06F 9/5088 |
| 2018/0004827 A1* | 1/2018 | Milne | .................... | G06F 16/258 |
| 2019/0034476 A1* | 1/2019 | Arora | .................... | G06F 21/6227 |
| 2019/0384693 A1* | 12/2019 | Dai | ...................... | G06F 11/3612 |
| 2020/0065020 A1* | 2/2020 | Tai | ...................... | G06F 12/0246 |
| 2021/0026714 A1* | 1/2021 | Burns | .................... | G06F 9/546 |
| 2021/0182294 A1* | 6/2021 | Teen | .................... | G06F 16/24542 |
| 2021/0182415 A1* | 6/2021 | Arasan | ................ | G06F 21/6227 |
| 2021/0279221 A1* | 9/2021 | Taylor | ................ | G06F 16/2272 |
| 2021/0286848 A1* | 9/2021 | Bedi | .................... | G06F 16/90335 |
| 2022/0100869 A1* | 3/2022 | Berger | ................ | G06F 21/552 |
| 2023/0177043 A1* | 6/2023 | Jenuwine | .............. | G06F 16/258 |
| | | | | 707/609 |
| 2023/0267109 A1* | 8/2023 | Fink | .................. | G06F 16/24568 |
| | | | | 707/696 |
| 2023/0393832 A1* | 12/2023 | Touati | .................... | H04L 67/10 |
| 2024/0211437 A1* | 6/2024 | Higgins | .................. | G06F 16/13 |
| 2024/0362208 A1* | 10/2024 | Naufel | .................. | G06F 16/243 |
| 2025/0231908 A1* | 7/2025 | Ravinuthala | .......... | G06F 16/116 |

* cited by examiner

AUTOMATED CONVERSION OF BIG DATA QUERIES AND SCRIPTS

BACKGROUND

Field

This field is generally related to converting queries and scripts used in big data system such that queries written for a first big data system are executable by a second big data system.

Related Art

As enterprise computing systems and technologies continue to evolve, businesses face the issue of managing massive sets of data. For example, a particular enterprise computing system may handle multiple applications which all may generate and manage their own datasets but may also interface with and interact with other datasets managed by other applications. To consolidate, manage, and provide analytics related to such quantities of data, "big data" technology has been developed. Big data may refer to data sets that are too large or complex to be dealt with by traditional data-processing application software. For example, big data technologies may handle collections of large datasets that include large volume, high velocity, and/or large varieties of data.

While systems exist to handle and manage big data, there are issues that arise when seeking to migrate data from one format to another format. For example, when large quantities of data are migrated from on-premises systems to cloud-based systems, such issues may arise. For example, commands or queries that may have been used to interact with the data pre-migration may not be usable post-migration. The inability to rely on previously used commands or queries may restrict operations or create obstacles to interacting with the data.

BRIEF SUMMARY

Disclosed herein are system, apparatus, device, method and/or computer program product embodiments, and/or combinations and sub-combinations thereof, for converting queries and scripts used in big data system such that queries written for a first big data system are executable by a second big data system.

In some embodiments, a script conversion system receives a script to convert from a first big data format to a second big data format. As will be further described below, the script conversion system may use a mapping of functions to perform the conversion. The mapping may include direct function mappings and/or indirect function mappings. Direct function mappings may refer to functions that exist in both the first and second big data formats. Indirect function mappings may refer to functions that exist in the first big data format but may not have a direct conversion in the second big data format. For example, there may be non-equivalent parameters between the functions or the position of the parameters may different between the formats. To account for these differences, the script conversion system performs the indirect function mapping with additional processing to manipulate the original query.

The script conversion system may additionally format converted queries with additional parameters specific to the second big data format. This formatting may supply additional parameters used by the second big data format that may not be used or present in the first big data format. In this manner, the script conversion system may automate the conversion and/or formatting of queries and functions. The script conversion system then compiles the converted queries into a converted script, which may then be used to interact with the data. For example, the converted script may be stored in a database or memory and/or executed by a computing system.

As further described below, the script conversion system converts a script from a first big data format to a second big data format. To provide an example of the context for the script conversion, this disclosure will describe the conversion of a Hive™ script to a BigQuery™ script. In this example, the first big data format may be a Hive™ format and the second big data format may be a BigQuery™ format. This conversion is provided as an example and does not limit the disclosure solely to this type of conversion. Rather, the conversion of big data scripts described herein may apply to other big data systems and configurations as well and as further described below.

A Hive™ script may be used in an Apache® system such as Hadoop®. Hive™ is a data warehouse infrastructure tool used to process structured data in Hadoop®. Google's BigQuery™ may refer to a cloud-based data warehouse. In the example conversion described below, big data may be migrated from an on-premises data warehouse to a cloud-based data warehouse. An example may be a migration of data from a Hive™ system to a BigQuery™ system. This migration may include moving large volumes of data.

An enterprise system, however, may have already written scripts in the Hive™ format and may have used such scripts to query and/or manipulate data in the Hive™ system. After migration, however, data analytics systems are not able to directly apply such scripts to the BigQuery™ system. To address this issue, the script conversion system provides an automated process for converting Hive™ scripts to BigQuery™ scripts. Following the conversion, the script conversion system converts the previously defined scripts, queries, and/or functions into a compliant format. Data analytics systems are then able to use the converted scripts, which have the same functionality as the original scripts, to interface with the big data post-migration. For example, a data analytics system may use the converted script and/or set up an automatic execution of a converted script, to perform analytics and/or retrieve data from the BigQuery™ system. While a conversion of a Hive™ script to a BigQuery™ script is described throughout this disclosure, other data warehouse systems may also be used such as IBM® Integrated Analytics System, Pivotal Greenplum™, SAP HANA®, Amazon Redshift™, Microsoft Azure™, Snowflake™, other on-premises data warehouses, other cloud data warehouses, and/or other big data storage systems.

By automatically converting big data scripts, the script conversion system provides computing efficiencies. For example, the script conversions system provides savings on computing processing by automating potentially manual re-construction of scripts in another big data format. To provide these efficiencies, the script conversion system utilizes a configuration file with a mapping of direct functions and indirect functions to convert queries. This configuration file accounts for the mapping of functions, arguments, and/or argument positions to construct queries in the proper big data format. The automatic conversion of the big data scripts and/or code also provides standardization of scripts, queries, and/or codes to a standardized format. Additionally, time efficiencies are also provided as the script conversion system is able to quickly generate a converted script. The script conversion system provides time savings relative to manual replacement and drafting of new scripts. Additionally, as further described below, the script conversion system also generates a report identifying any potential errors in conversion. This may alert a system administrator or data analyst of any corrections that may be made. This alert may be useful when automating the conversion of a massive number of scripts. In this manner, the script conversion system may automate the conversion of a large volume of enterprise-wide scripts and/or automate the conversion of potentially hundreds of thousands of script files.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
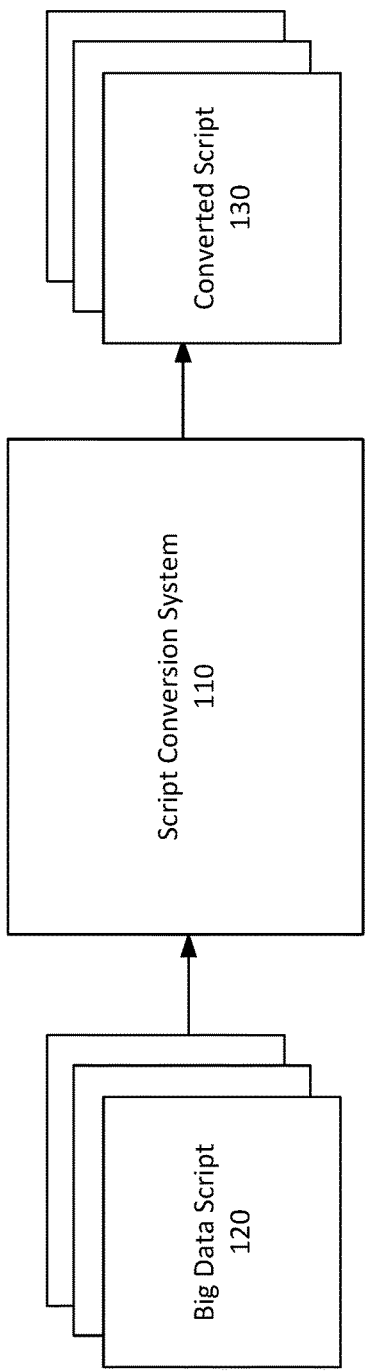
FIG. 1 depicts a block diagram of a script conversion environment, according to some embodiments.

Provided herein are system, apparatus, device, method and/or computer program product embodiments, and/or combinations and sub-combinations thereof, for converting queries and scripts used in big data system such that queries written for a first big data system are executable by a second big data system.

In some embodiments, a script conversion system receives a script to convert from a first big data format to a second big data format. The first big data format may corresponding to the first big data system while the second big data format may correspond to the second big data system. The script conversion system may receive a script including one or more queries corresponding to the first big data format. For example, when executing on a computing system, the script conversion system may load a big data script file. The script conversion system may then sanitize or clean the script to generate a sanitized version of the script. This may include removing empty lines, comments, and/or parameters that are not used by the second bit data system. This generates a sanitized version of the script to be used by the script conversion system to generate the converted script.

The script conversion system may then retrieve or load a configuration file. The configuration file may include a mapping of functions from the first big data format to functions from the second big data format. For example, the configuration file may be JSON file. The configuration file may include a mapping that includes direct function mappings and/or indirect function mappings. Direct function mappings may refer to functions that exist in both the first and second big data formats. Indirect function mappings may refer to functions that exist in the first big data format but may not have a direct conversion in the second big data format. For example, there may be non-equivalent parameters between the functions or the position of the parameters may different between the formats. To account for these differences, the script conversion system performs the indirect function mapping with additional processing to manipulate the original query.

Upon loading the configuration file, the script conversion system loads the queries from the big data script. Script conversion system may individually read each query. The script conversion system may then parse each query. In some embodiments, this parsing creates an abstract syntax tree (AST) structure for each query. The tree structure may include information such as which tables are being utilized, which rows and/or columns are being utilized, which query functions are being utilized, the parameters associated with the particular function, and/or other information.

For each query, the script conversion system may use the tree structure to determine whether the functions may be directly mapped or indirectly mapped to a function in the second big data format. Using the mapping in the configuration file, the script conversion system may then convert each query from the first big data format to a corresponding query in the second big data format.

In some embodiments, in addition to the conversion of the direct and/or indirect functions, the script conversion system may also apply formatting and/or other data to conform the queries to the second big data format. For example, the script conversion system may apply a project mapping to the converted queries. This may provide a configuration specific to the second big data format. For example, a project map may provide a project name and/or a dataset name. The first big data format may not use these parameters but the second big data format require such parameters to execute a function. The script conversion system may provide the project map to supply any missing information that is needed for the second big data system. In this manner, the script conversion system may generate one or more converted queries corresponding to the one or more converted functions.

The script conversion system may then assemble a converted script using the one or more converted queries. The converted script may be stored and/or execute to perform the original functionality from the original big data script file. In generating the converted script, the script conversion system may also track the number of queries to be converted, the number of successful conversions, and/or the number of unsuccessful conversions. With this information, the script conversion system may generate a report. The report may be, for example, a command line output, a file with the results, a message with the results, and/or other notification indicating the conversion results. In some embodiments, the report may indicate which queries were successfully and/or unsuccessfully converted. For the unsuccessfully converted queries, the conversion may be performed manually by a reviewer.

Various embodiments of these features will now be discussed with respect to the corresponding figures.

FIG. 1 depicts a block diagram of a script conversion environment 100, according to some embodiments. Script conversion environment 100 includes script conversion system 110, big data scripts 120, and/or converted scripts 130. As further described below, script conversion system 110 may execute the methods and/or programming described with reference to FIG. 2, FIG. 3, and/or FIG. 4. Script conversion system 110 may convert one or more big data scripts 120 to converted scripts 130.

Script conversion system 110 may be a computer system such as computer system 500 described with reference to FIG. 5. For example, script conversion system 110 may be implemented using one or more servers and/or databases. In some embodiments, script conversion system 110 may be implemented using a computing device such as a desktop workstation, laptop or notebook computer, netbook, tablet, smart phone, and/or other computing device. In some embodiments, script conversion system 110 may be implemented as an application in an enterprise computing system.

Script conversion system 110 may convert big data scripts 120 to converted scripts 130. A big data script 120 may be a file with one or more queries corresponding to a first big data system. For example, big data script 120 may be a text file with functions and/or arguments that are organized as queries. These queries may correspond to queries for a first big data system. For example, big data scripts 120 may include queries corresponding to a Hive™ system for storing data. Script conversion system 110 may convert these big data scripts 120 to converted scripts 130. Converted scripts 130 correspond to a second big data format and/or second big data system. For example, this may be a BigQuery™ system.

To convert big data scripts 120, script conversion system 110 may retrieve and/or load one or more big data scripts 120. For example, big data scripts 120 may have been stored in memory of script conversion system 110. In some embodiments, script conversion system 110 may load big data scripts 120 from one or more applications executed on an enterprise computing system. For example, this may be a cloud computing platform and/or a web application used to interface with data stored or managed by the enterprise computing system.

After conversion, script conversion system 110 may generate converted scripts 130. The converted scripts 130 may be saved as files similar to big data scripts 120. These files may be text files and/or may include one or more converted queries. For example, script conversion system 110 may save converted scripts 130 to a data repository on an enterprise computing system. An application on the enterprise computing system may then use and/or execute the functions in converted scripts 130 to interface with a second big data system. For example, this may be a BigQuery™ system. As previously explained, large volumes of data may have been moved from a first big data system to a second big data system. Using converted scripts 130, applications may interface with the data post-migration.

Figure 2:
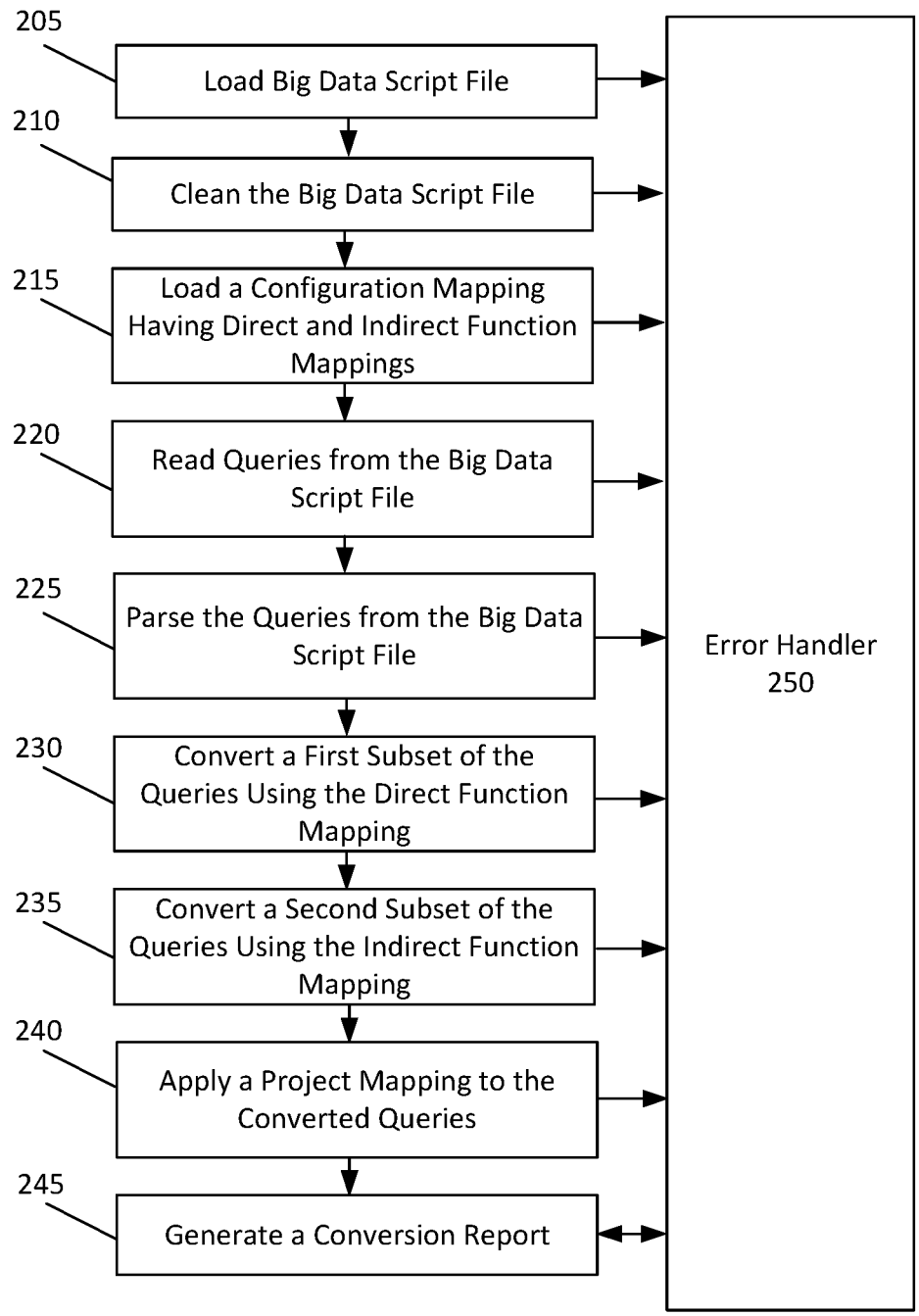
FIG. 2 depicts a flowchart illustrating a method for converting a big data script, according to some embodiments.

FIG. 2 depicts a flowchart illustrating a method 200 for converting a big data script, according to some embodiments. Method 200 shall be described with reference to FIG. 1; however, method 200 is not limited to that example embodiment.

In an embodiment, script conversion system 110 may utilize method 200 to convert big data script 120 to converted script 130. This conversion may convert the queries and/or functions in a big data script 120 using direct function mapping and/or indirect function mapping. Script conversion system 110 may also identify potential errors throughout the conversion process and/or generate a reporting indicating successful and/or unsuccessful conversions. The foregoing description will describe an embodiment of the execution of method 200 with respect to script conversion system 110. While method 200 is described with reference to script conversion system 110, method 200 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2, as will be understood by a person of ordinary skill in the art.

At 205, script conversion system 110 may load a big data script file. This may be similar to big data script 120. Script conversion system 110 may load the big data script 120 file from a data repository. For example, script conversion system 110 may be commanded to retrieve the big data script file from a particular folder and/or place in memory. The big data script 120 file may be a file with one or more queries corresponding to a first big data system. For example, big data script 120 may be a text file with functions and/or arguments that are organized as queries. Examples of such queries are provided below. In some embodiments, a user may load a single file and/or a folder with multiple script files.

At 210, script conversion system 110 may clean the big data script file. This cleaning may remove text included in the big data script file that is not used to generate a query corresponding to the second big data system. For example, this may include removing parameters and/or settings specific to the first big data system. In some embodiments, the cleaning of the file may also include removing empty lines, comments provided in the text, and/or memory commands not relevant to the second big data system. As a result of this cleaning, script conversion system 110 may generate clean textual queries for mapping and/or converting.

At 215, script conversion system 110 may load a configuration mapping having direct and indirect mapping functions. In some embodiments, the configuration mapping may be a configuration provided by a JSON file. This configuration mapping may be predefined and/or used to convert functions from the first big data format to the second big data format. For example, the configuration mapping may convert the particular text of the queries and/or functions to follow the second big data format. In an example provided below, the configuration mapping may provide an example conversion of a Hive™ function to a BigQuery™ function.

The direct function mapping may be used when there is a function that is equivalent between the first and second big data formats. For example, if the syntax is similar and/or if the arguments to the function are the same and/or are in the same position, a direct mapping may be used. An example of a direct mapping may be replacing the syntax for the function. An indirect function mapping may be used when additional processing is used to convert the function. For example, this may occur when different functions are needed, the function parameters or arguments differ, there is a mismatch in quantity of parameters or arguments, if the position of the parameters or arguments in the function differ, and/or other differences result in additional processing. The configuration file may identify a particular query in the first big data format and re-form the query to the second big data format via an indirect function mapping.

At 220, script conversion system 110 may read queries from the big data script file. For example, script conversion system 110 may identify the number of queries in the big data script file and/or individually load each of the queries for processing. In some embodiments, script conversion system 110 may perform the processes at 225, 230, and 235 on individual queries. In some embodiments, script conversion system 110 may perform the processes at 225, 230, and 235 on the batch of queries.

At 225, script conversion system 110 may parse the queries from the big data script file. This parsing may create a tree structure for each query. For example, script conversion system 110 may create an abstract syntax tree (AST) structure for each query. The tree structure may include information such as which tables are being utilized, which rows and/or columns are being utilized, which query functions are being utilized, the parameters associated with the particular function, and/or other information.

For example, a query may be "drop table my_table;". A corresponding tree structure may be parsed as:
    Nil
        TOK_DROPTABLE
            TOK_TABNAME
                my_table
            <EOF>

In the tree, the droptable function may be identified. The tree also includes the table name which may have been provided as "my_table". This tree structure parses the query and may be used by script conversion system 110 to generate the corresponding converted query. In some embodiments, a Hive™ parser may be used to generate the tree structure.

For each query, script conversion system 110 may use the tree structure to determine whether the functions may be directly mapped or indirectly mapped to a function in the second big data format. For example, script conversion system 110 may compare text strings corresponding to the functions to determine whether a direct or indirect mapping is to be applied. Script conversion system 110 may identify a matching text string in the configuration file mapping to determine whether a function is to be directly mapped or indirectly mapped. Using the mapping in the configuration file, the script conversion system may then convert each query from the first big data format to a corresponding query in the second big data format.

At 230, script conversion system 110 may convert a first subset of the queries using the direct function mapping. This direct mapping conversion may occur for functions in the first big data format having an equivalent function in the second big data format. For example, this conversion may be a replacement of a function name. In this scenario, the direct function mapping may be used to convert the query. Examples of functions with direct mapping are provided below for the conversion of Hive™ queries to BigQuery™ queries:

For the function "INSERT INTO TABLE", the pre-conversion query may have the format "INSERT INTO TABLE table_name (column) Values." while the post-conversion query may have the format "INSERT INTO table_name (column) Values.".

For the function "IBECLTRIM", the pre-conversion query may have the format "ibecltrim(a.tax_no)" while the post-conversion query may have the format "ltrim(a.tax_no)".

For the function "UCASE", the pre-conversion query may have the format "select ucase(trim(odl_nm)) as name" while the post-conversion query may have the format "select upper(trim(odl_nm)) as name".

For the function "LCASE", the pre-conversion query may have the format "select lcase(trim(odl_nm)) as name" while the post-conversion query may have the format "select lower(trim(odl_nm)) as name".

For the function "ARRAY( )", the pre-conversion query may have the format "select array(expression) as array;" while the post-conversion query may have the format "select array[expression] as array;".

For the function "RLIKE", the pre-conversion query may have the format "select (CASE WHEN ((CUST_DECISION RLIKE ("DEC")) OR (CUST_DECISION IS NULL) OR (CUST_DECISION="")) THEN "DEC" ELSE null END);" while the post-conversion query may have the format:
    SELECT
        CASE
            WHEN regexp_contains(cust_decision, 'DEC')
            OR cust_decision IS NULL
            OR cust_decision="THEN 'DEC'
            ELSE null
        END;

For the function "Double equal to operator (==)", the pre-conversion query may have the format "SELECT (CASE WHEN col=="abc" then 'yes' else 'no' end) as u;" while the post-conversion query may have the format "SELECT (CASE WHEN col="abc" then 'yes' else 'no' end) as u;".

In these examples, a direct mapping function may be used to convert the syntax from the first big data format to the second big data format. The matching function strings may be identified in the configuration file to perform the mapping. These examples are not exhaustive but rather are illustrative. Other functions may also be mapped directly.

At 235, script conversion system 110 may convert a second subset of the queries using the indirect function mapping. Indirect function mappings may refer to functions that exist in the first big data format but may not have a direct conversion in the second big data format. For example, there may be non-equivalent parameters between the functions or the position of the parameters may different between the formats. The number of arguments may differ, the order of the arguments may differ, a combination of functions may be needed in the second big data format to perform the functionality of the original query, and/or other differences. To account for these differences, the script conversion system performs the indirect function mapping with additional processing to manipulate the original query. Script conversion system 110 may also identify a query as having an indirect mapping based on a matching text string identification in the configuration file. Script conversion system 110 then re-forms the query using the syntax of the second big data format.

Examples of functions with indirect mapping are provided below for the conversion of Hive™ queries to BigQuery™ queries. For these functions, additional reorganization of the query may occur to perform the indirect mapping.

For the function "DATEDIFF", the pre-conversion query may have the format "select datediff('2021-03-01', '2021-04-01') as diff;" while the post-conversion query may have the format "select date_diff('2021-03-01','2021-04-01', day) as diff;". In this example, the first big data format may use two parameters in a date format and may provide a difference between the two dates. The second big data format, however, may expect an additional parameter when returning a date differential. For example, the argument may indicate whether the result returned is a number of days, a number of weeks, or a number of months. Script conversion system 110 accounts for this additional parameter and supplies a parameter when building the converted query.

Additional examples of indirect function conversion are presented below:

For the function "First_Value", the pre-conversion query may have the format "select first_value(col, true) as fv;" while the post-conversion query may have the format "select first_value(col IGNORE NULLS) as fv;".

For the function "trunc", the pre-conversion query may have the format "select trunc(current_dateo,'MONTH') as month" while the post-conversion query may have the format "select date_trunc(current_date( ),MONTH) as month".

For the function "format_number", the pre-conversion query may have the format "select format_number (1045678444,0) as u;" while the post-conversion query may have the format "SELECT FORMAT("%'d",1045678444) as u;". Another example of this conversion may be converting "select format_number(1045678444.5,0) as u;" to "SELECT FORMAT("%'.f",1045678444.5) as u;". Yet another example may be converting "select format_number (1045678444.55467,n) as u;" to "SELECT FORMAT ("%'.nf",1045678444.5) as u;".

For the function "WEEKOFYEAR", the pre-conversion query may have the format "select weekofyear(datevalue)" while the post-conversion query may have the format "select extract(week from datevalue)".

For the function "from_unixtime", the pre-conversion query may have the format "select from_unixtime(5678556, "yyyy-MM-dd");" while the post-conversion query may have the format "select format_timestamp("% Y-% m-d", timestamp_seconds(5678556))".

For the function "PERCENTILE", the pre-conversion query may have the format "SELECT name, percentile (total_count,0.9989) as threshold_value from table1 group by name;" while the post-conversion query may have the format "select name, approx_quantiles(table1.total_count, 100)[OFFSET(99)] AS threshold_value from table1 group by name;".

For the function "PERCENTILE_APPROX", the pre-conversion query may have the format "SELECT percentile_approx(total_count,0.95) as threshold_value from table1 group by name;" while the post-conversion query may have the format "select name, approx_quantiles (table1.total_count, 100)[OFFSET(95)] AS threshold_value from table1 group by name;".

For the function "DOUBLE", the pre-conversion query may have the format "SELECT double(col) as col1;" while the post-conversion query may have the format "SELECT cast(col as float64) as col1;".

For the function "INSERT OVERWRITE TABLE", the pre-conversion query may have the format:
"insert overwrite table 'gcp-project-name'.my_dataset.my_destination_table
SELECT my_source_table.col1,
my_source_table.col2,
my_source_table.col3;"
while the post-conversion query may have the format:
"TRUNCATE TABLE 'gcp-project-name'.my_dataset.my_destination_table;
INSERT INTO 'prj-d-600001717-ingestion'.my_dataset.my_destination_table
SELECT
my_source_table.col1,
my_source_table.col2;
my_source_table.col3;"

For the function "Group By", the pre-conversion query may have the format "select col1, ARRAY(1,2,3,4,5,6) as array group by array;" while the post-conversion query may have the format "select col1, format('% t', ARRAY[1,2,3,4,5,6]) as array group by array;".

For the function "STRING", the pre-conversion query may have the format "select string(1000) as str;" while the post-conversion query may have the format "select cast (1000 as string) as str;".

For the function "DOUBLE PRECISION", the pre-conversion query may have the format "select cast(col as double precision) as col1" while the post-conversion query may have the format "select cast(col as float64) as col1".

For the function "MONTHS_BETWEEN", the pre-conversion query may have the format "select MONTHS_BETWEEN(CURRENT_DATEO, MY_DATE_COLUMN) as diff from my_table;" while the post-conversion query may have the format "select trunc(CAST(datetime_diff(CAST (current_date( ) as DATETIME), my_date_column, MONTH) as FLOAT64)+CAST(datetime_diff(CAST(current_date( ) as DATETIME), datetime_add(my_date_column, interval datetime_diff(CAST(current_date( ) as DATETIME), my_date_column, MONTH) MONTH), SECOND) as FLOAT64)/NUMERIC '2678400') as diff from my_gcp_project.my_dataset.my_table;".

For the function "PMOD", the pre-conversion query may have the format "select PMOD(765.876,600.88) as u;" while the post-conversion query may have the format ""SELECT
CAST(mod(mod(CAST(765.876 as BIGNUMERIC),
CAST(600.88 as BIGNUMERIC))+CAST(600.88 as
BIGNUMERIC), CAST(600.88 as BIGNUMERIC))
as FLOAT64) AS u"".

For the function "from_unixtime", the pre-conversion query may have the format "select from_unixtime(5678556, "yyyy-MM-dd");" while the post-conversion query may have the format "select format_timestamp("% Y-% m-% d",timestamp_seconds(5678556))".

Using the parsed query, script conversion system 110 determines whether to perform a direct or indirect conversion and/or how to perform the conversion.

At 240, script conversion system 110 may apply a project mapping to the converted queries. The project mapping may be additional data to configure a query into the second big data format. For example, a project map may provide a project name and/or a dataset name. This may append a project name and/or dataset identifier to the query. The first big data format may not use these parameters but the second big data format require such parameters to execute a function. Script conversion system 110 may provide the project map to supply any missing information that is needed for the second big data system.

For example, prior to applying the project map, a query may be "DROP TABLE IF EXISTS base_from_table;". After applying the project map, the query may be "DROP TABLE IF EXISTS 'my_project'.temp.base_from_table;". In this example, the name of the project "my_project" may be added and the dataset for table creation may be identified as "temp". The "temp" identifier identifies the dataset for creating the table. The project mapping may apply to direct function mappings and/or indirect function mappings. In some embodiments, the project mapping is included in the configuration mapping provided at 215. In some embodiments, the project mapping is separate from the configuration mapping provided at 215. Using the configuration file, script conversion system 110 may generate one or more converted queries corresponding to the one or more converted functions.

At 245, script conversion system 110 may generate a conversion report. The conversion report may be, for example, a command line output, a file with the results, a message with the results, and/or other notification indicating the conversion results. The report may include a number of queries identified for conversion, the number of successfully converted queries, and/or the number of unsuccessfully converted queries. In some embodiments, the report may indicate which queries were successfully and/or unsuccessfully converted. For the unsuccessfully converted queries, the conversion may be performed manually by a reviewer. The conversion report may be provided for each big data script file that is converted.

To generate the conversion report, script conversion system 110 may use error handler 250. Error handler 250 may be a service that tracks potential errors that may occur during the conversion process. As seen in FIG. 2, error handler 250 may monitor errors or failure states that occur at each part of the method. By tracking this error information, script conversion system 110 may generate the conversion report and provide analytics related to successful conversions and/or failed conversions.

After converting the big data script file queries, script conversion system 110 may generate a corresponding converted script 130. The converted scripts 130 may be saved as files similar to big data scripts 120. These files may be text files and/or may include one or more converted queries. For example, script conversion system 110 may save converted scripts 130 to a data repository on an enterprise computing system. An application on the enterprise computing system may then use and/or execute the functions in converted scripts 130 to interface with a second big data system. For example, this may be a BigQuery™ system. As previously explained, large volumes of data may have been moved from a first big data system to a second big data system. Using converted scripts 130, applications may interface with the data post-migration.

Figure 3:
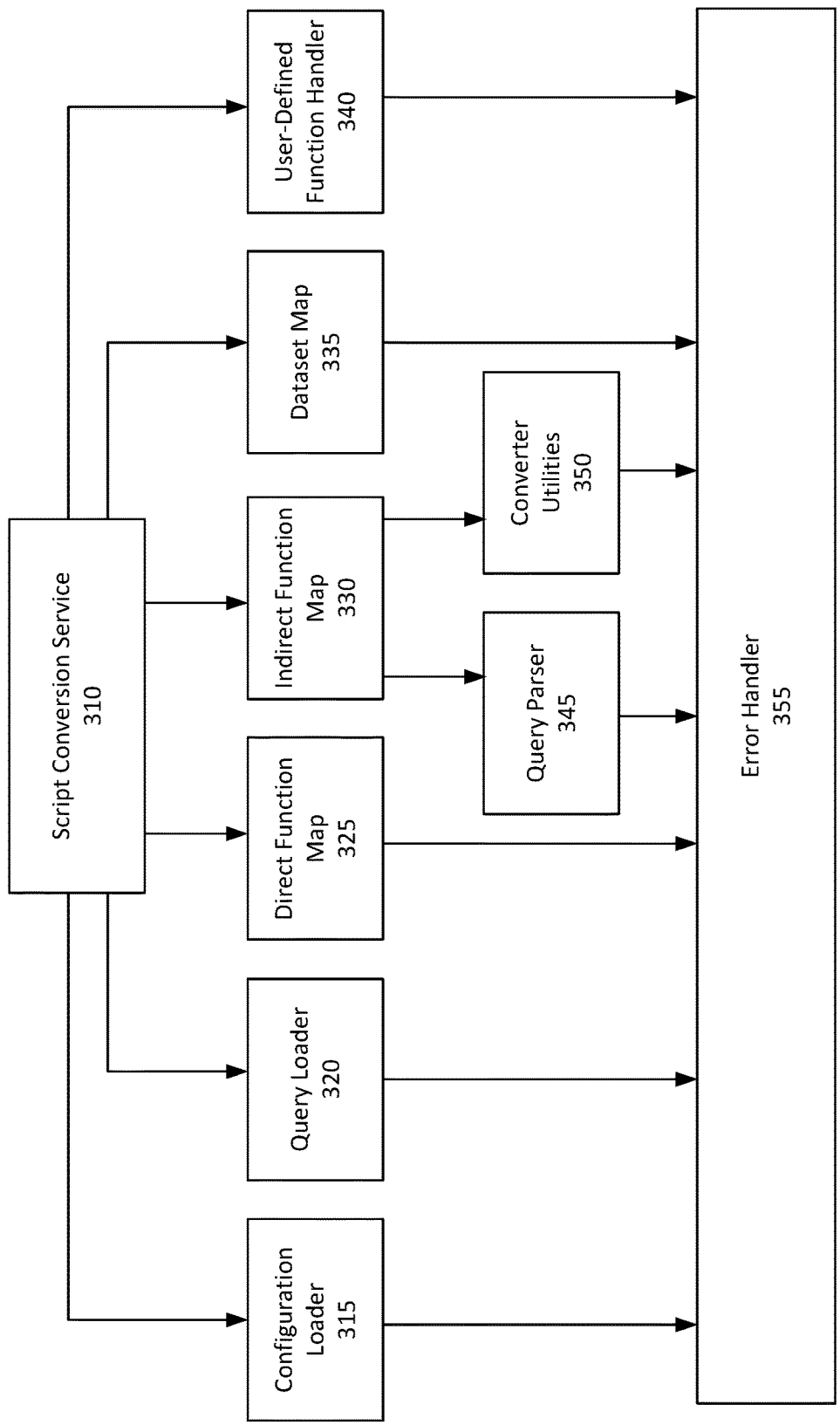
FIG. 3 depicts a block diagram of a programming flow for a script conversion system, according to some embodiments.

FIG. 3 depicts a block diagram of a programming flow 300 for a script conversion system 110, according to some embodiments. The programming flow 300 depicts components and/or services used by script conversion system 110 to convert a big data script 120 to a converted script 130. In some embodiments, script conversion system 110 may use programming flow 300 when executing the methods described with reference to FIG. 2 and/or FIG. 4.

Programming flow 300 includes script conversion service 310. Script conversion service 310 may reflect the main function used by script conversion system 110. For example, script conversion service 310 may include computer-executable instructions and/or programming used for converting scripts and/or queries. Script conversion service 310 may use configuration loader 315, query loader 320, direct function map 325, indirect function map 330, dataset map 335, user-defined function (UDF) handler 340, query parser 345, converter utilities 350, and/or error handler 355 to perform the conversion. These components may also be implemented using computer-executable instructions, programming, and/ or applications used by script service 310.

Configuration loader 315 may be a service that loads a JSON configuration file. Configuration loader 315 may load the configuration file from memory on script conversion system 110. This may occur in a manner similar to 215 as described with reference to FIG. 2. Query loader 320 may load and/or clean queries from scripts loaded by script conversion service 310. This may occur in a manner similar to 205, 210, and 220 as described with reference to FIG. 2. Direct function map 325 may perform a direct mapping conversion of the queries. This may occur in a manner similar to 230 as described with reference to FIG. 2.

Indirect function map 330 may perform the indirect mapping conversion of the queries. This may occur in a manner similar to 235 as described with reference to FIG. 2. Indirect function map 330 may also use query parser 345 and/or converter utilities to perform the conversion. Query parser 345 may be used to generate a tree structure for a query in a manner similar to 225 as described with reference to FIG. 2. The converter utilities 350 may include programming used to re-format the query into a format corresponding to a second big data system. This may occur in a manner similar to 235 as described with reference to FIG. 2. Dataset map 335 may provide dataset and/or project identification information to the converted queries. This may be through a table dataset map and/or may occur in a manner similar to 240 as described with reference to FIG. 2. For example, a BigQuery™ dataset may be contained in a particular project. The dataset may be a container or top-level container used to organize access to tables and/or views.

User-defined function (UDF) handler 340 may convert user-defined functions. For example, these may include functions written in other programming languages, such as Java. A UDF may include a function that may not be explicitly provided by the first big data format and/or the first big data system. For example, a user may define a function to perform a calculation that does not have a direct function in Hive™. The user may write a function and/or logic to perform this calculation instead. UDF handler 340 may also convert such functions. This may be through the use of direct and/or indirect mappings as well. Error handler 335 may be used to identify errors similar to error handler 250 as described with reference to FIG. 2. Script conversion service 310 may use such information to generate the conversion report described at 245.

Figure 4:
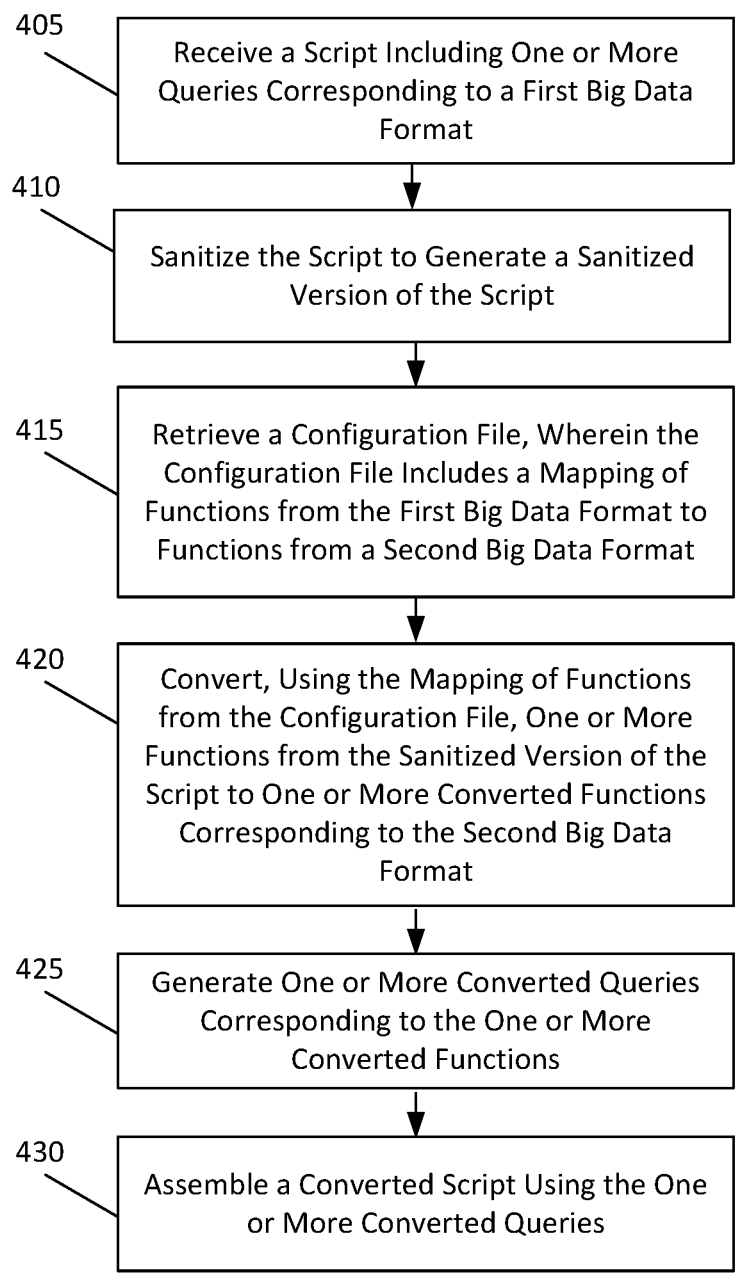
FIG. 4 depicts a flowchart illustrating a method for generating a converted script from a big data script, according to some embodiments.

FIG. 4 depicts a flowchart illustrating a method 400 for generating a converted script 130 from a big data script 120, according to some embodiments. Method 400 shall be described with reference to FIG. 1; however, method 400 is not limited to that example embodiment.

In an embodiment, script conversion system 110 may utilize method 400 to convert big data script 120 to converted script 130. This conversion may convert the queries and/or functions in a big data script 120 from a first big data format to a second big data format. The foregoing description will describe an embodiment of the execution of method 400 with respect to script conversion system 110 and/or method 200. While method 400 is described with reference to script conversion system 110, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 405, script conversion system 110 may receive a script including one or more queries corresponding a first big data format. The script may be big data script 120. The first big data format may correspond to a first big data system, which may use a corresponding syntax for queries. Script conversion system 110 may receive the script from an external system and/or load the script from memory. In some embodiments, this may occur in a manner similar to 205 as describe with reference to FIG. 2.

At 410, script conversion system 110 may sanitize the script to generate a sanitized version of the script. This may include sanitizing the text of the script and/or text of the queries in the script. This may occur in a manner similar to 210 as describe with reference to FIG. 2. The sanitized version of the script may be a format that provides a more accurate identification of functions and/or function arguments for conversion. For example, the sanitized version of the script may allow faster identification of matching syntax.

At 415, script conversion system 110 may retrieve a configuration file. The configuration file includes a mapping of functions from the first big data format to functions from a second big data format. As previously described, the configuration file and/or the mapping may include direct and/or indirect mappings of functions. The configuration mapping and its application to queries and scripts is similar to 215, 230, and 235 as described with reference to FIG. 2.

At 420, script conversion system 110 may convert, using the mapping of functions from the configuration file, one or more functions from the sanitized version of the script to one or more converted functions corresponding to the second big data format. For example, this may occur in a manner similar to 220, 225, 230, 235, and 240 as described with reference to FIG. 2. For example, script conversion system 110 may parse each query from the sanitized version of the script. This may allow for more efficient function identification and/or matching due to the reduction of unnecessary text. The parsing may also organize the arguments for creating the converted queries. Script conversion system 110 may then convert one or more queries using a direct function mapping. This may include replacing syntax text of the function from the first big data format with syntax text of a corresponding function in the second big data format.

Script conversion system 110 may also convert one or more queries using an indirect function mapping. For example, script conversion system 110 may construct an equivalent function in the second big data format based on identified syntax text of a function in the first big data format. For example, script conversion system 110 may identify the function in the first big data format. Based on the identification of this function, script conversion system 110 may use the mapping in the configuration file to identify one or more functions in the second big data format that may be used to perform an equivalent function. The configuration file may also indicate a formatting for this function and/or indicate the positions for arguments and/or parameters. Script conversion system 110 may construct the equivalent function using the parameters provided in the original query along with the mapping in the configuration file.

At 425, script conversion system 110 may generate one or more converted queries corresponding to the one or more converted functions. This may include applying formatting and/or parameters specific to the second big data format to generate the converted queries. For example, this may occur in a manner similar to 240 as described with reference to FIG. 2. In scenarios where the second big data system uses project and/or dataset information, script conversion system 110 may also apply a project mapping to the converted queries to format the queries for the second big data system.

At 430, script conversion system 110 may assemble a converted script 130 using the one or more converted queries. Converted script 130 may be saved as a file. For example, converted script 130 may be a text file that includes the include one or more converted queries. Script conversion system 110 may save converted scripts 130 to a data repository on an enterprise computing system. An application on the enterprise computing system may then use and/or execute the functions in converted scripts 130 to interface with the second big data system. For example, this may be a BigQuery™ system. As previously explained, large volumes of data may have been moved from a first big data system to a second big data system. Using converted scripts 130, applications may interface with the data post-migration.

Similarly, when executing method 400, script conversion system 110 may also track errors and/or generate a conversion report as described with reference to 245 and 250 from FIG. 2.

Figure 5:
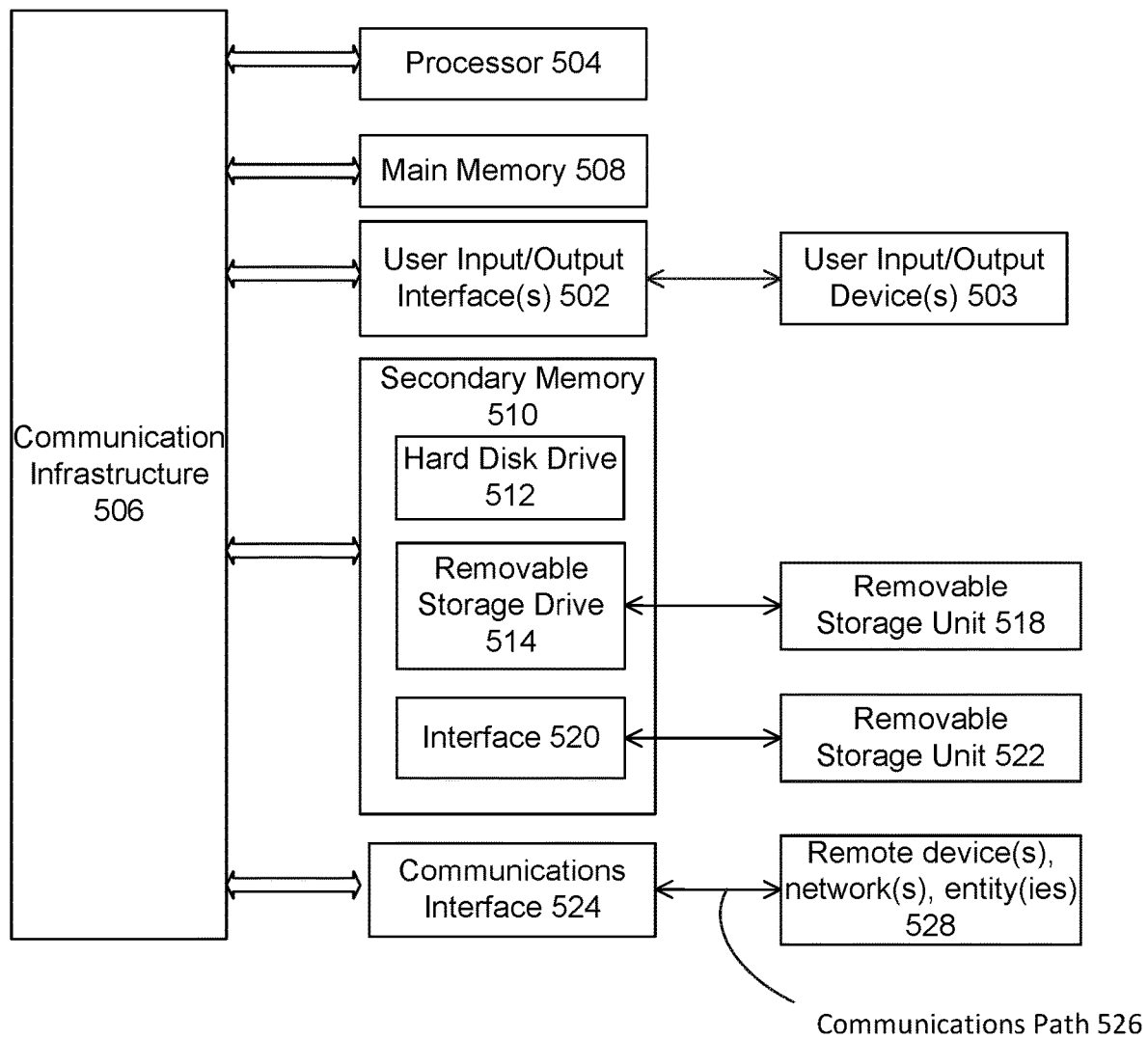
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   migrating data from a first big data system corresponding to a first big data format to a second big data system corresponding to a second big data format;
   determining the data in the second big data format is not queryable by using a script written in the first big data format, wherein the script is configured to perform an original function associated with the data in the first big data format;
   in response to the determining, performing a conversion of the script from the first big data format to the second big data format, comprising:

receiving the script associated with the data including one or more queries corresponding to the first big data format;
sanitizing text of the script to generate a sanitized version of the script;
retrieving a configuration file, wherein the configuration file comprises a direct mapping and an indirect mapping of functions from the first big data format to functions from the second big data format;
converting one or more functions from the sanitized version of the script to one or more converted functions corresponding to the second big data format, comprising:
applying, to convert the one or more functions, the direct mapping when the one or more functions exist in both the first big data format and the second big data format, or the indirect mapping when the one or more functions only exist in the first big data format, wherein while the indirect mapping is applied, providing one or more parameters associated with the second big data format to execute the one or more functions;
generating one or more converted queries corresponding to the one or more converted functions;
configuring the one or more converted queries into the second big data format by appending, to the one or more converted queries, the one or more parameters associated with the second big data format; and
assembling a converted script using the configured one or more converted queries, wherein the converted script is configured to perform the original function associated with the data in the second big data format;
in response to the performing the conversion of the script from the first big data format to the second big data format:
executing the one or more functions in the converted script to interface with the data in the second big data format; and
generating a conversion report indicating a number of successful query conversions and a number of unsuccessful query conversions.

2. The computer implemented method of claim 1, wherein the converting further comprises:
parsing a query from the sanitized version of the script into a tree structure.

3. The computer implemented method of claim 1, wherein the converting further comprises:
replacing, via the direct mapping included in the configuration file, syntax text of a function in the first big data format with syntax text of a corresponding function in the second big data format.

4. The computer implemented method of claim 1, wherein the converting further comprises:
constructing, via the indirect mapping included in the configuration file, an equivalent function in the second big data format based on syntax text of a function in the first big data format.

5. The computer implemented method of claim 1, wherein the generating further comprises:
adding a dataset identifier to the one or more converted functions to generate the one or more converted queries.

6. The computer implemented method of claim 1, wherein the first big data format corresponds to an on-premises data warehouse system and wherein the second big data format corresponds to a cloud-based data warehouse system.

7. A system, comprising:
a memory; and
at least one processor coupled to the memory and configured to:
migrate data from a first big data system corresponding to a first big data format to a second big data system corresponding to a second big data format;
determine the data in the second big data format is not queryable by using a script written in the first big data format, wherein the script is configured to perform an original function associated with the data in the first big data format;
in response to the determination, perform a conversion of the script from the first big data format to the second big data format, comprising:
receive the script associated with the data including one or more queries corresponding to the first big data format;
sanitize text of the script to generate a sanitized version of the script;
retrieve a configuration file, wherein the configuration file comprises a direct mapping and an indirect mapping of functions from the first big data format to functions from the second big data format;
convert one or more functions from the sanitized version of the script to one or more converted functions corresponding to the second big data format, comprising:
applying, to convert the one or more functions, the direct mapping when the one or more functions exist in both the first big data format and the second big data format, or the indirect mapping when the one or more functions only exist in the first big data format, wherein while the indirect mapping is applied, providing one or more parameters associated with the second big data format to execute the one or more functions;
generate one or more converted queries corresponding to the one or more converted functions;
configure the one or more converted queries into the second big data format by appending, to the one or more converted queries, the one or more parameters associated with the second big data format; and
assemble a converted script using the configured one or more converted queries, wherein the converted script is configured to perform the original function associated with the data in the second big data format;
in response to perform the conversion of the script from the first big data format to the second big data format:
execute the one or more functions in the converted script to interface with the data in the second big data format; and
generate a conversion report indicating a number of successful query conversions and a number of unsuccessful query conversions.

8. The system of claim 7, wherein to convert the one or more functions, the at least one processor is further configured to:
parse a query from the sanitized version of the script into a tree structure.

9. The system of claim 7, wherein to convert the one or more functions, the at least one processor is further configured to:
 replace, via the direct mapping included in the configuration file, syntax text of a function in the first big data format with syntax text of a corresponding function in the second big data format.

10. The system of claim 7, wherein to convert the one or more functions, the at least one processor is further configured to:
 construct, via the indirect mapping included in the configuration file, an equivalent function in the second big data format based on syntax text of a function in the first big data format.

11. The system of claim 7, wherein to generate the one or more converted queries, the at least one processor is further configured to:
 add a dataset identifier to the one or more converted functions to generate the one or more converted queries.

12. The system of claim 7, wherein the first big data format corresponds to an on-premises data warehouse system and wherein the second big data format corresponds to a cloud-based data warehouse system.

13. A non-transitory computer-readable device having instructions stored thereon that, when executed by at least one computing device, cause the at least one computing device to perform operations comprising:
 migrating data from a first big data system corresponding to a first big data format to a second big data system corresponding to a second big data format;
 determining the data in the second big data format is not queryable by using a script written in the first big data format, wherein the script is configured to perform an original function associated with the data in the first big data format;
 in response to the determining, performing a conversion of the script from the first big data format to the second big data format, comprising:
  receiving the script associated with data including one or more queries corresponding to the first big data format;
  sanitizing text of the script to generate a sanitized version of the script;
  retrieving a configuration file, wherein the configuration file comprises a direct mapping and an indirect mapping of functions from the first big data format to functions from the second big data format;
  converting one or more functions from the sanitized version of the script to one or more converted functions corresponding to the second big data format, comprising:
   applying, to convert the one or more functions, the direct mapping when the one or more functions exist in both the first big data format and the second big data format, or the indirect mapping when the one or more functions only exist in the first big data format, wherein while the indirect mapping is applied, providing one or more parameters associated with the second big data format to execute the one or more functions;
  generating one or more converted queries corresponding to the one or more converted functions;
  configuring the one or more converted queries into the second big data format by appending, to the one or more converted queries, the one or more parameters associated with the second big data format; and
  assembling a converted script using the configured one or more converted queries, wherein the converted script is configured to perform the original function associated with the data in the second big data format;
 in response to the performing the conversion of the script from the first big data format to the second big data format:
  executing the one or more functions in the converted script to interface with the data in the second big data format; and
  generating a conversion report indicating a number of successful query conversions and a number of unsuccessful query conversions.

14. The non-transitory computer-readable device of claim 13, wherein the converting further comprises:
 parsing a query from the sanitized version of the script into a tree structure.

15. The non-transitory computer-readable device of claim 13, wherein the converting further comprises:
 replacing, via the direct mapping included in the configuration file, syntax text of a function in the first big data format with syntax text of a corresponding function in the second big data format.

16. The non-transitory computer-readable device of claim 13, wherein the converting further comprises:
 constructing, via the indirect mapping included in the configuration file, an equivalent function in the second big data format based on syntax text of a function in the first big data format.

17. The non-transitory computer-readable device of claim 13, wherein the generating further comprises:
 adding a dataset identifier to the one or more converted functions to generate the one or more converted queries.

* * * * *